United States Patent
Takizawa et al.

(10) Patent No.: US 8,761,845 B2
(45) Date of Patent: Jun. 24, 2014

(54) COMMUNICATION APPARATUS AND HANDOVER CONTROL METHOD

(75) Inventors: Eiichiro Takizawa, Yokohama (JP); Taketoshi Arakawa, Yokohama (JP); Masaki Sakurai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 46 days.

(21) Appl. No.: 13/437,430

(22) Filed: Apr. 2, 2012

(65) Prior Publication Data

US 2012/0264429 A1  Oct. 18, 2012

(30) Foreign Application Priority Data

Apr. 14, 2011 (JP) ................. 2011-089936

(51) Int. Cl.
*H04M 1/00* (2006.01)

(52) U.S. Cl.
USPC ........... 455/574; 455/436; 370/311; 370/331; 370/338

(58) Field of Classification Search
USPC .............. 455/422.1, 425, 428, 436–445, 455/572–574, 343.1–343.6; 370/328, 338, 370/311, 352
See application file for complete search history.

(56) References Cited

U.S. PATENT DOCUMENTS

| | | | | |
|---|---|---|---|---|
| 7,027,773 | B1 * | 4/2006 | McMillin | 455/41.2 |
| 7,061,891 | B1 * | 6/2006 | Kilfoyle et al. | 370/335 |
| 7,212,818 | B2 * | 5/2007 | Haumont | 455/435.1 |
| 7,991,399 | B2 * | 8/2011 | Ganesan | 455/436 |
| 8,077,671 | B2 * | 12/2011 | Lee et al. | 370/331 |
| 2002/0080778 | A1 | 6/2002 | Matsugatani et al. | |
| 2010/0035614 | A1 * | 2/2010 | Yokota et al. | 455/436 |
| 2011/0026494 | A1 | 2/2011 | Nagasawa et al. | |
| 2011/0151876 | A1 * | 6/2011 | Ishii et al. | 455/437 |
| 2013/0072194 | A1 * | 3/2013 | Tooyama et al. | 455/436 |

FOREIGN PATENT DOCUMENTS

| | | |
|---|---|---|
| JP | 2004304841 A | 10/2004 |
| JP | 2006180413 A | 7/2006 |
| JP | 2006310973 A | 11/2006 |
| JP | 2008-236079 A | 10/2008 |
| JP | 2009-049875 A | 3/2009 |
| JP | 2011-155589 A | 8/2011 |
| WO | 2009119765 A1 | 10/2009 |

* cited by examiner

*Primary Examiner* — Sharad Rampuria (74) *Attorney, Agent, or Firm* — Volpe and Koenig, P.C.

(57) ABSTRACT

It is provided a communication apparatus connected to first and second wireless networks which performs handover between the first and second wireless networks, including first and second wireless functional units which obtain connection states and wireless quality of the wireless networks. A transmitter and a receiver of the first wireless functional unit are activated, a transmitter of the second wireless functional unit is deactivated, a receiver of the second wireless functional unit is activated and the wireless quality of the first wireless network and the second wireless network are obtained when a connection between the first wireless functional unit and the first wireless network is in a connected state. The transmitter and the receiver of the first wireless functional unit are deactivated, the transmitter and the receiver of the second wireless functional unit are activated and the data suppression process is canceled after the completion of the handover.

8 Claims, 10 Drawing Sheets

COMMUNICATION APPARATUS AND HANDOVER CONTROL METHOD

CLAIM OF PRIORITY

The present application claims priority from Japanese patent application JP 2011-089936 filed on Apr. 14, 2011, the content of which is hereby incorporated by reference into this application.

BACKGROUND OF THE INVENTION

The present invention relates to a hybrid communication terminal capable of communication with a plurality of networks and particularly to the handover technology thereof.

A mobile communication system is about to transition from the CDMA method having been used in 3G and 3.5G networks to next-generation networks such as faster WiMAX (registered trademark) and LTE (Long Term Evolution). However, since a service area is limited at the beginning of a transition to the next-generation networks, the need for hybrid communication terminals using a combination of a conventional network such as the 3G network and the next-generation network increases.

Although various forms such as data cards to be connected to PCs (Personal Computers) and handsets which do not receive power supply from PCs have been commercialized as communication terminals, miniaturization, weight saving and power saving are required in either case.

JP 2008-236079 A discloses a communication terminal which monitors wireless communication quality between the communication terminal and a first network and is connected to a second network if the wireless communication quality falls below a threshold value.

JP 2009-49875 A discloses a communication terminal which obtains information on communication quality between the communication terminal and each network, power consumption at the time of communication with each network, a communication rate with each network, communication applications used and the like, and utilizes these pieces of obtained information for handover between a first network and a second network.

SUMMARY OF THE INVENTION

<Problem Due to a Delay in the Determination of a System>

The conventional technique of handover between conventional different networks requires a facility for handover at each network side in addition to a communication terminal.

A communication terminal includes a handover circuit and a network needs to include a handover facility. In consideration of future system migration, ease of roaming and the like, the network side facility generally utilizes a facility which supports a method specified by a standard group (e.g. 3GPP and 3GPP2 in the 3G network, IEEE, WiMAX Forum and the like in WiMAX, 3GPP in LTE).

In this case, a handover service between these networks cannot be provided until these standard groups specify the specification of handover between the WiMAX network and the 3G network and the specification of handover between the LTE network and the 3G network. Further, the network side facility is expensive and cost burden for facility investment is high. Further, networks immediately after the start of service such as WiMAX and LTE have a small service area, roaming with existing networks is generally supported, but there is a problem that a roaming service cannot be provided until use is specified.

<Problem in the Case of Dealing on the Communication Terminal Side>

Preferably, the communication terminal side is simultaneously connected to both networks, compares wireless communication quality of the both networks, selects the network with a better environment, and constantly hands the communication over to the network with a better environment. However, when the communication terminal is simultaneously connected to the both networks, circuits for connection with the respective networks need to be simultaneously operated. In such a case, about twice as much power as a normal single terminal needs to be supplied.

However, in the case of receiving power supply from a PC, there are not many general-purpose interfaces which can supply a large amount of power to be consumed. Conversely, an interface capable of supplying a large amount of power can be used in limited PCs, with the result that the spread to the market does not progress. Further, even in the case of no power supply from the PC, an operating time by a built-in battery becomes shorter.

<Technique Disclosed in Prior Art Literatures>

The communication terminal disclosed in JP 2008-236079 A is connected to the second network when the wireless communication quality with the connected first network falls below the predetermined threshold value, whereby the communication terminal is simultaneously connected to different networks and the same data is transmitted from the communication terminal to the both networks, and the first network is disconnected to hand over the communication when the wireless communication quality between the communication terminal and the second network exceeds a certain threshold value. Thus, circuits corresponding to the respective networks simultaneously operate and power consumption increases in high-speed communication such as 3G, WiMAX or LTE communication.

Next, the communication terminal disclosed in JP 2009-49875 A measures power consumption in the case of connection with each network and hands over the communication to the network with less power consumption within a range that the use of an application does not become difficult. Thus, after measuring power consumption for communication with the first network, the communication terminal is connected to the second network and measures power consumption with the communication with the first network maintained. Therefore, power consumption increases.

Further, since parameters used in determining handover are measured in real time, these measuring circuits may become larger in scale and the miniaturization of the communication terminal becomes difficult.

That is, the above problems cannot be solved by the conventional technique.

The representative one of inventions disclosed in this application is outlined as follows. There is provided a communication apparatus which is connected to a first wireless network and a second wireless network and performs handover between the first wireless network and the second wireless network, including a first wireless functional unit which connects to the first wireless network, a second wireless functional unit which connects to the second wireless network, and a connection unit for connecting the first wireless functional unit and the second wireless functional unit to a computer. The first wireless functional unit obtains a connection state and wireless quality of the first wireless network. The second wireless functional unit obtains a connection state and wireless quality of the second wireless network. The handover between the first wireless network and the second wireless network is controlled in accordance with instructions from the computer based on the connection states and the wireless quality obtained by the first wireless functional unit and the second wireless functional unit. A transmitter and a receiver of the first wireless functional unit are activated, a transmitter of the second wireless functional unit is deactivated, a receiver of the second wireless functional unit is activated and the wireless quality of the first wireless network and the second wireless network are obtained in a case where a connection between the first wireless functional unit and the first wireless network is in a connected state. The first wireless functional unit checks a communication state in a case where the wireless quality of the first wireless network is less than a predetermined threshold and the wireless quality of the second wireless network is more than the predetermined threshold The first wireless functional unit starts a data suppression process in a case of carrying out communication The first wireless functional unit checks the communication state after the start of the data suppression process The first wireless functional unit performs the handover after being transitioned to a standby state in a case of carrying out communication. The transmitter and the receiver of the first wireless functional unit are deactivated, the transmitter and the receiver of the second wireless functional unit are activated and the data suppression process is canceled after the completion of the handover.

According to a representative embodiment of the present invention, it is possible to confirm the wireless quality of a second wireless network during connection to a first wireless network and perform handover while suppressing power consumption.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Hereinafter, embodiments of the present invention are described by way of examples with reference to the drawings. Although 3G and WiMAX networks are described as examples of wireless networks, application to other networks such as LTE network is also possible.

First Embodiment

1. System Configuration

Figure 1:
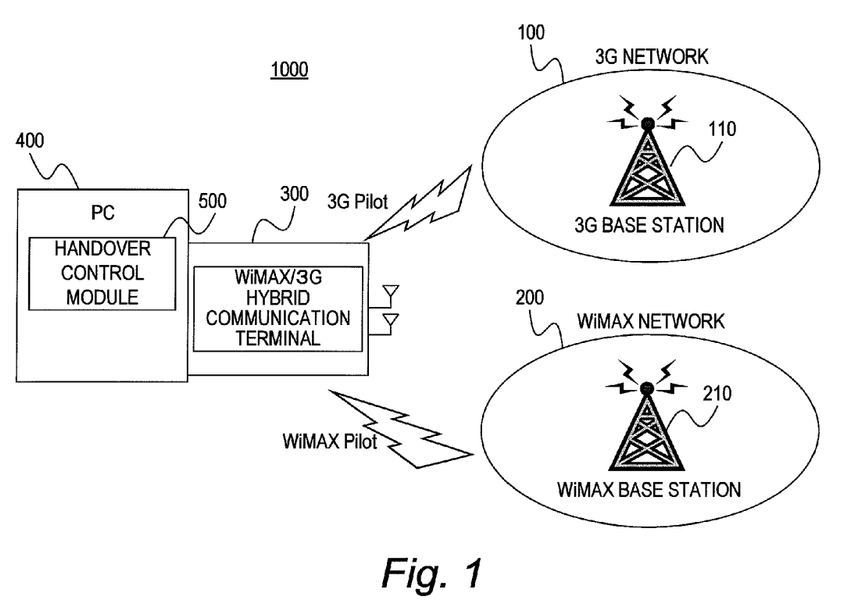
FIG. 1 is a diagram showing the configuration of a wireless network according to a first embodiment.

FIG. 1 is a diagram showing the configuration of a wireless network 1000 according to a first embodiment of the present invention.

The wireless network 1000 of the first embodiment includes a 3G network, a WiMAX network 200 and a communication terminal 300.

The communication terminal 300 is a hybrid communication terminal 300 capable of communication with the 3G network 100 and the WiMAX network 200 and is connected to a personal computer (PC) 400. The PC 400 is equipped with a handover control module 500 which is a program (software) for controlling handover between the 3G network and the WiMAX network. The 3G network 100 includes a 3G base station 110 and the WiMAX network 200 includes a WiMAX base station 210.

Figure 2:
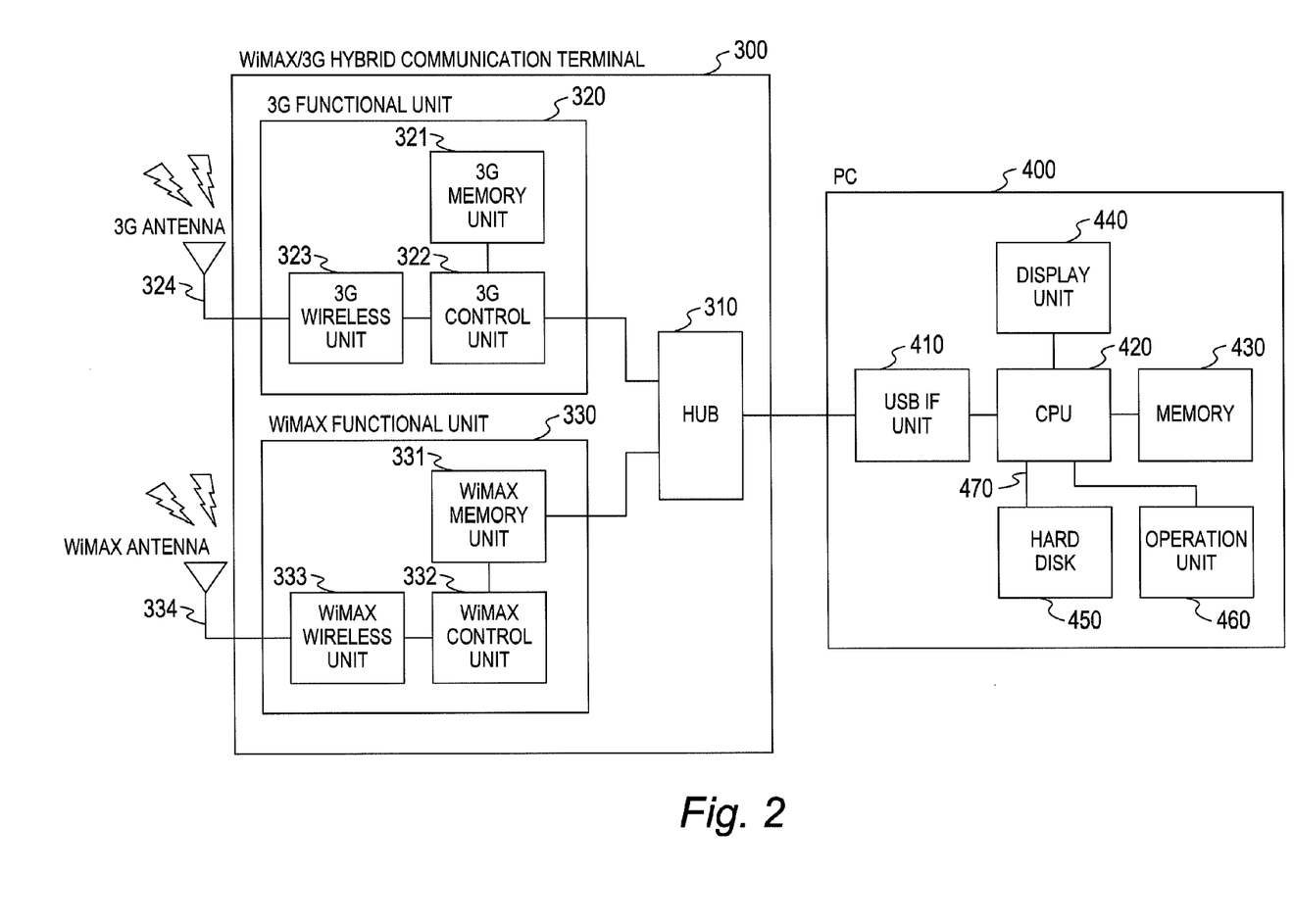
FIG. 2 is a block diagram showing the configurations of a hybrid communication terminal and a personal computer (PC) according to the first embodiment.

FIG. 2 is a block diagram showing the configurations of the hybrid communication terminal 300 and the PC 400 of the first embodiment.

The hybrid communication terminal 300 includes a hub 310, a 3G functional unit 320 and a WiMAX functional unit 330.

The 3G functional unit 320 includes a 3G memory unit 321, a 3G control unit 322, a 3G wireless unit 323 and a 3G antenna 324.

The 3G memory unit 321 is a nonvolatile storage device for storing a program to be executed by the 3G control unit 322 and data to be used at the time of executing the program. The 3G control unit 322 executes a protocol control (call request, incoming calls, handover, etc.) of the 3G network by executing the program stored in the 3G memory unit 321. It should be noted that a part or all of the functions of the 3G control unit 322 may be realized by firmware or hardware.

The 3G wireless unit 323 generates a wireless signal for communication with the 3G base station 110 and receives a wireless signal from the 3G base station 110. The 3G antenna 324 transmits and receives wireless signals to and from the 3G base station 110.

The WiMAX functional unit 330 includes a WiMAX memory unit 331, a WiMAX control unit 332, a WiMAX wireless unit 333 and a WiMAX antenna 334.

The WiMAX memory unit 331 is a nonvolatile storage device for storing a program to be executed by the WiMAX control unit 332 and data to be used at the time of executing the program. The WiMAX control unit 332 executes a protocol control (call request, incoming calls, handover, etc.) of the WiMAX network by executing the program stored in the WiMAX memory unit 331. It should be noted that a part or all of the functions of the WiMAX control unit 332 may be realized by firmware or hardware.

The WiMAX wireless unit 333 generates a wireless signal for communication with the WiMAX base station 210 and receives a wireless signal from the WiMAX base station 210. The WiMAX antenna 334 transmits and receives wireless signals to and from the WiMAX base station 210.

The hub 310 connects the 3G functional unit 320 and the WiMAX functional unit 330 to the PC 400.

The PC 400 includes a USB IF unit 410, a CPU 420, a memory 430, a display unit 440, a storage device 450, an operation unit 460 and an internal communication line 470 for connecting them.

The USB IF unit 410 is a serial interface and connected to the hybrid communication terminal 300 in this embodiment. The CPU 420 executes a program stored in the memory 430. The handover control module 500 is configured by executing this program. The memory 430 is a volatile or nonvolatile storage device for storing the program to be executed by the CPU 420 and data to be used at the time of executing the program and, for example, a RAM.

The display unit 440 includes a display screen (e.g. liquid crystal display device) which provides information to a user. The storage device 450 is a nonvolatile storage device for storing the program to be executed by the CPU 420 and data to be used at the time of executing the program and, for example, a hard disk drive or a flash memory. The operation unit 460 is a human interface which receives input from the user and, for example, a keyboard, a mouse or the like.

The internal communication line 470 is a communication bus connecting the configurations described above.

Figure 3:
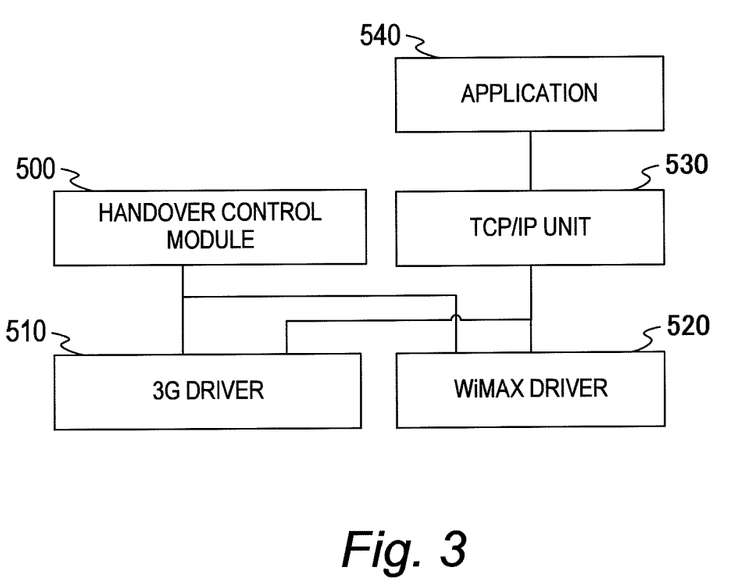
FIG. 3 is a functional block diagram of the PC according to the first embodiment.

FIG. 3 is a functional block diagram of the PC 400 of the first embodiment.

The PC 400 of the first embodiment includes the handover control module 500, a 3G driver 510, a WiMAX driver 520, a TCP/IP unit 530 and an application 540.

The 3G driver 510 and the WiMAX driver 520 perform processes of connection, disconnection, handover, obtaining state and obtaining wireless quality with the 3G network 100 and the WiMAX base station 210 by respectively transferring signals to and from the 3G base station 110 and the WiMAX base station 210.

The 3G driver 510 and the WiMAX driver 520 respectively transfer signals to and from the 3G control unit 322 and WiMAX control unit 332 in accordance with a command transmitted from the handover control module 500.

The application 540 transmits and receives data via the TCP/IP unit 530. The TCP/IP unit 530 transmits and receives data to and from the 3G driver 510 or the WiMAX driver 520 that is connected.

2. Operation

First, states between the hybrid communication terminal 300 and the 3G network 100 or the WiMAX network 200 are distinguished into a connected state, communicating state, a standby state and a waiting state.

The connected state is a state where a connection between the hybrid communication terminal 300 and the 3G network 100 or the WiMAX network 200 is completed, i.e. a state where a wireless session, a PPP (Point-to-Point Protocol) connection, a TCP connection are established. The connected state includes the communicating state and the standby state.

The communicating state is a state where the hybrid communication terminal 300 is carrying out data communication with the 3G network 100 or the WiMAX network 200 and also expressed as an active state.

The standby state is a state where a wireless connection is open between the hybrid communication terminal 300 and the 3G network 100 or the WiMAX network 200, but the wireless session, the PPP connection and the TCP connection are maintained. That is, if it returns from the standby state to the communicating state, a state is set where communication can be continued. The standby state is expressed as a dormant state in the 3G network 100 and an idle state in the WiMAX network 200.

The waiting state is a state where the hybrid communication terminal 300 is connected neither to the 3G network 100 nor to the WiMAX network 200.

Next, the handover from the WiMAX network 200 to the 3G network 100 is described with reference to FIGS. 4A and 4B. It should be noted that the handover from the 3G network 100 to the WiMAX network 200 is possible by a procedure similar to that shown in FIGS. 4A and 4B.

In a case where the hybrid communication terminal 300 is in the communicating state with the 3G network 100 (3G active state) (1001), the handover control module 550 is so controlled that a transmitter (Tx) and a receiver (Rx) of the 3G wireless unit 323 are both in an active state and a transmitter (Tx) and a receiver (Rx) of the WiMAX wireless unit 333 are both in an inactive state (1002). Here, Tx, Rx, ON and OFF respectively denote the transmitter, the receiver, the active state and the inactive state.

The handover control module 550 periodically obtains the state (connected state, communicating state, standby state, waiting state, etc.) and the wireless quality of the 3G network 100 from the 3G control unit 322 via the 3G driver 510.

The handover control module 550 periodically requests Tx:OFF/Rx:ON to the WiMAX driver 520 to confirm the wireless quality of the WiMAX network 200. The WiMAX driver 520 transfers the request of Tx:OFF/Rx:ON to the WiMAX control unit 332. In a case of receiving the request of Tx:OFF/Rx:ON, the WiMAX control unit 332 sets the WiMAX wireless unit 333 in a state of Tx:OFF/Rx:ON (1003) and transmits a completion response of Tx:OFF/Rx:ON to the handover control module 550 via the WiMAX driver 520 (1004).

The handover control module 550 transmits a pilot acquisition request to the WiMAX control unit 332 via the WiMAX driver 520 (1005). The WiMAX control unit 332 obtains the wireless quality of the WiMAX network 200 from the WiMAX wireless unit 333 and notifies it to the handover control module 550 via the WiMAX driver 520 (1006).

After obtaining the wireless quality of the WiMAX network 200, the handover control module 550 transmits a request of Tx:OFF/Rx:OFF to the WiMAX control unit 332 via the WiMAX driver 520 and sets the WiMAX wireless unit 333 in a state of Tx:OFF/Rx:OFF (1007, 1008).

Normally, power consumption is large at the transmission side of the wireless unit in each system. Thus, as described in Steps 1003 to 1008, it is possible to obtain the wireless quality of the other wireless network during the communicating state with one wireless network while reducing the power consumption of the hybrid communication terminal 300 by activating only the reception side of the system that is not connected.

The handover control module 550 checks whether an avoid timer is running. The avoid timer is a timer used to prevent the flapping of the handover. Since the handover is not performed while the avoid timer is running, unstable communication caused by the flapping of the handover can be prevented. Unless the avoid timer is running, the wireless quality of the 3G network 100 and the WiMAX network 200 are confirmed.

The handover control module 550 requests the handover to the 3G driver 510 (1009) in a case where the wireless quality of the 3G network 100 is below a reference value and that of the WiMAX network 200 is above a reference value.

Here, an example of wireless quality judgment is described. That the wireless quality of the 3G network 100 is below the reference value is judged by RSSI (Received Signal Strength Indication)≤reference value "a" or CINR (Carrier to Interference and Noise Ratio)≤reference value "b". That the wireless quality of the WiMAX network 200 is above the reference value is judged by RSSI≥reference value "c" and CINR≥reference value "d".

The 3G driver 510 having received a handover request checks the state of the 3G network 100. As a result, in the communicating state with the 3G network 100, a data suppression process is performed (1010) to prevent the missing of a packet during the handover. The data suppression process is described in detail later.

After the data suppression process, the 3G driver 510 checks the state of the 3G network 100. As a result, in a case where the 3G network 100 is in the communicating state after the data suppression process, a transition to the standby state is requested to the 3G control unit 322 (1011).

The 3G control unit 322 checks whether a protocol process is in progress. As a result, in a case where the protocol process is in progress, the 3G control unit 322 transmits a standby state transition pending response. The 3G driver 510 transmits a standby state transition request again after the elapse of a predetermined time in a case of receiving the standby state transition pending response.

On the other hand, in a case where the protocol process is not in progress, the 3G control unit 322 transmits a connection close message to the 3G network 100 and transitions to the standby state (3G dormant state) (1012). The 3G control unit 322 transmits a standby state transition completion response to the 3G driver 510 (1013) after the transition to the standby state.

The 3G driver 510 transmits a handover completion response to the handover control module 550 (1014) after receiving the standby state transition completion response.

The handover control module 550 requests Tx:OFF/Rx:ON to the 3G control unit 322 via the 3G driver 510 after receiving the handover completion response. The 3G control unit 322 checks whether the protocol process is in progress. As a result, in a case where the protocol process is in progress, the 3G control unit 322 transmits a request pending response of Tx:OFF/Rx:ON. The handover control module 550 requests Tx:OFF/Rx:ON again after the elapse of a predetermined time in a case of receiving the request pending request of Tx:OFF/Rx:ON.

Whether the protocol process is in progress is checked here because the protocol process may be performed such as by crossing a sub-network in the 3G network 100, for example, in the standby state or the communicating state. If the transmitter of the 3G wireless unit 323 is stopped at this timing, the communication may be cut off, judging that the protocol process was interrupted halfway and session negotiation was failed at the network side. Thus, the disconnection of the communication can be prevented by keeping the handover on hold during the protocol process and starting the handover again after the protocol process is finished.

In a case where the protocol process is not in progress, the 3G control unit 322 sets the 3G wireless unit 323 in a state of Tx:OFF/Rx:ON (1015) and transmits a completion response of Tx:OFF/Rx:ON to the handover control module 550 via the 3G driver 510 (1016).

After receiving the completion response of Tx:OFF/Rx:ON, the handover control module 550 requests Tx:ON/Rx:ON to the WiMAX control unit 332 via the WiMAX driver 520. The WiMAX control unit 332 sets the WiMAX wireless unit 333 in a state of Tx:ON/Rx:ON (1017) and transmits a completion response of Tx:ON/Rx:ON to the handover control module 550 via the WiMAX driver 520 (1018).

After receiving the completion response of Tx:ON/Rx:ON, the handover control module 550 requests a connection to the WiMAX control unit 332 via the WiMAX driver 520 (1019). The WiMAX control unit 332 performs a connection process with the WiMAX network 200 (1020). The WiMAX control unit 332 transmits a connection completion response to the handover control module 550 via the WiMAX driver 520 (1021).

After the completion of the connection to the WiMAX network 200, the handover control module 550 requests a disconnection to the 3G control unit 322 via the 3G driver 510 (1022). The 3G control unit 322 transitions to the disconnected state by internally opening the wireless session and the like (1023). At this time, the 3G wireless unit 323 transmits no disconnection message to the 3G network 100 since the transmission side is in an inactive state. After the transition to the disconnected state, the 3G control unit 322 transmits a disconnection completion response to the handover control module 550 via the 3G driver 510 (1024).

The handover control module 550 requests Tx:OFF/Rx:OFF to the 3G control unit 322 via the 3G driver 510. The 3G control unit 322 sets the 3G wireless unit 323 in a state of Tx:OFF/Rx:OFF (1025) and transmits a completion response of Tx:OFF/Rx:OFF to the handover control module 550 via the 3G driver 510 (1026).

In a case of receiving the completion response of Tx:OFF/Rx:OFF, the handover control module 550 starts the avoid timer. The hybrid communication terminal 300 completes the handover and continues the communication with the WiMAX network 200 (1027).

It should be noted that, in a WiMAX active state, the 3G wireless unit 323 is set in the state of Tx:OFF/Rx:ON, the 3G control unit 322 obtains the wireless quality of the 3G network 100 from the 3G wireless unit 323 and notifies it to the handover control module 550 via the 3G driver 510 as in Steps 1003 to 1006.

Next, the data suppression process (1010 in FIG. 4A) is described with reference to FIG. 5. In this embodiment, an explicit congestion notification (ECN) function specified in RFC 3168 is used as the data suppression process.

In a case where the hybrid communication terminal 300 is in the communicating state with the 3G network 100 (3G active state) (1031), the TCP/IP-1 unit 530 and a TCP/IP-2 unit 531 transmit data with an ECT flag of an IP header of a packet to be transmitted set on to indicate the use of ECN (1032, 1033). It should be noted that in a case where the ECT (ECN Capable Transport) flag is on, it indicates that a congestion process is supported.

In a case of receiving a handover request from the handover control module 550 (1034), the 3G driver 510 checks whether the ECT flag of the IP header of the packet received from the TCP/IP-1 unit 530 is on. As a result, in a case where the ECT flag is on, a CE flag of this packet is set on and the packet is transferred to the TCP/IP-2 unit 531 (1035). Thereafter, the 3G driver 510 transmits the packet received from the TCP/IP-1 unit 530 with the CE flag thereof set on. It should be noted that in a case where the CE (Congestion Experienced) flag is on, it indicates an ongoing congestion.

In a case of receiving the packet including the CE flag being set on, the TCP/IP-2 unit 531 transmits an ACK in which an ECE flag of a TCP header is on to the TCP/IP-1 unit 530 (1036). It should be noted that in a case where the ECE (ECN Echo) flag is on, an ongoing congestion is notified.

In a case of receiving the ACK including the ECE flag of the TCP header being on, the TCP/IP-1 unit 530 reduces a transmission window and executes a congestion avoidance algorithm as the data suppression process (1037).

The TCP/IP-1 unit 530 transmits a next packet to the 3G driver 510 after setting a CWR flag of a TCP header thereof on. It should be noted that in a case where the CWR (Congestion Window Reduced) flag is on, it indicates the execution of the congestion avoidance algorithm. The 3G driver 510 transmits the packet received from the TCP/IP-1 unit 530 after a CE flag thereof is set on (1038).

In a case where receiving the packet including the CWR flag and the CE flag being on, the TCP/IP-2 unit 531 transmits an ACK, in which an ECE flag is on, to the TCP/IP-1 unit 530 as in Step 1036 (1039).

Figure 4A:
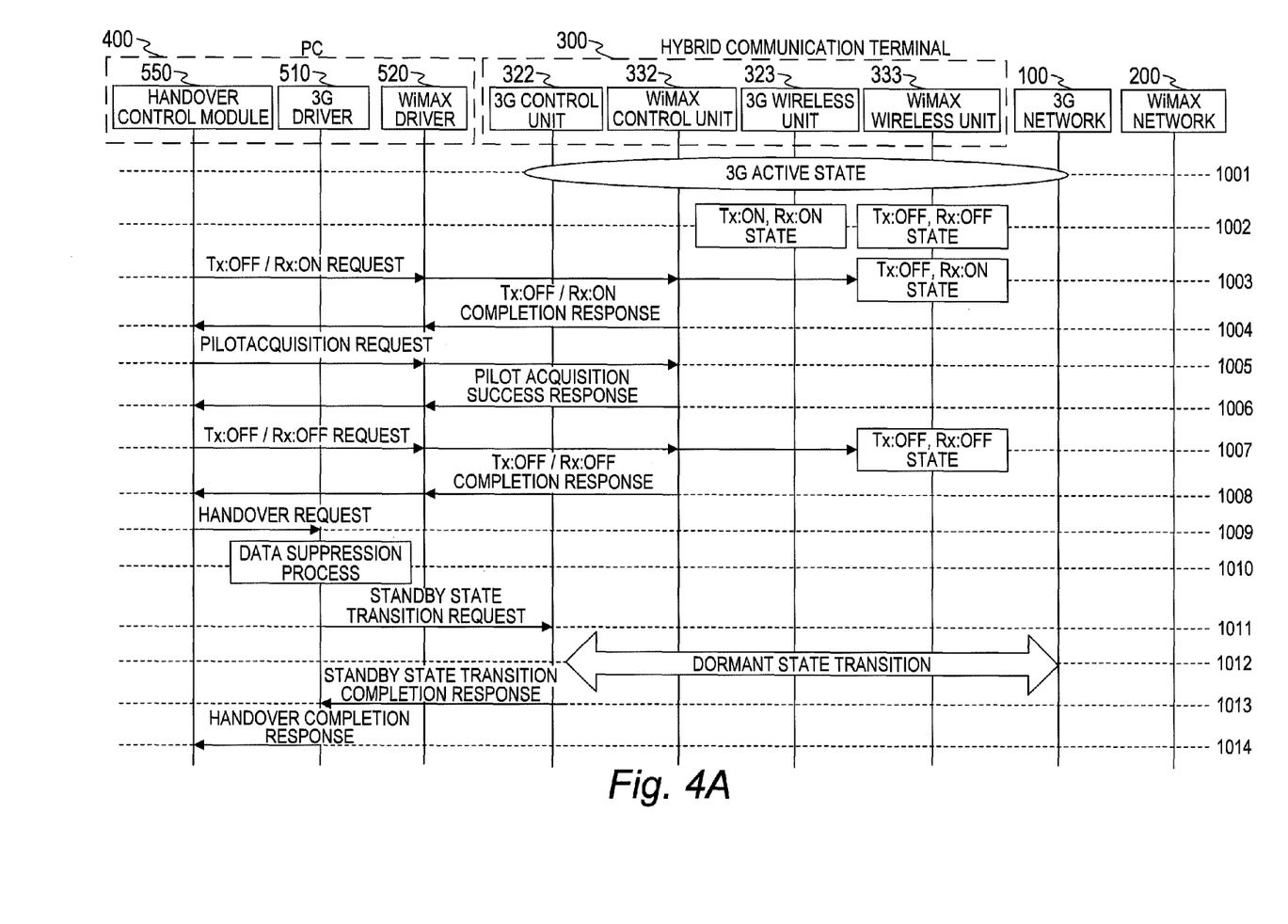
FIGS. 4A and 4B are sequence diagrams showing a process of a handover from a WiMAX network to a 3G network according to the first embodiment.
Figure 4B:
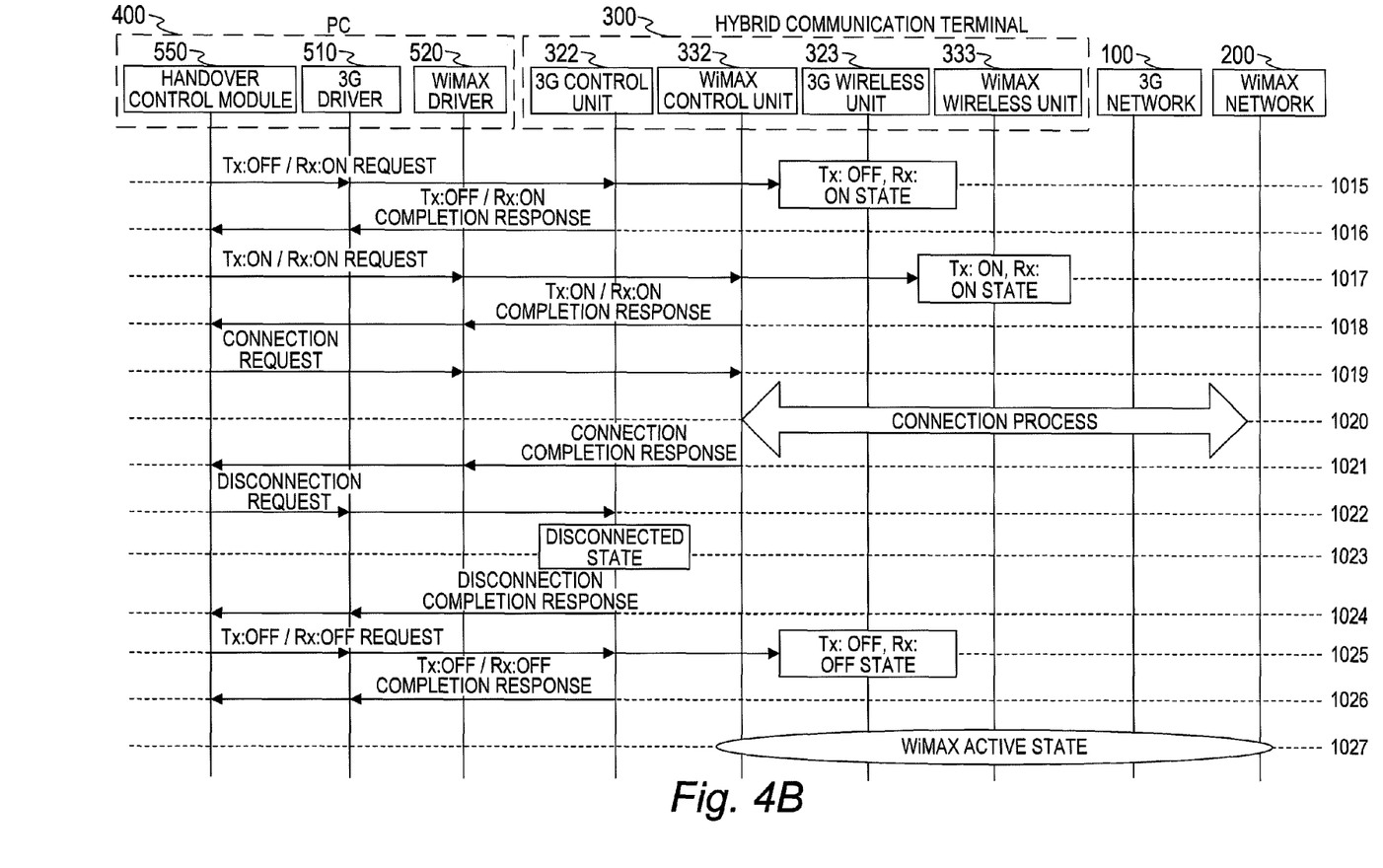
Figure 7:
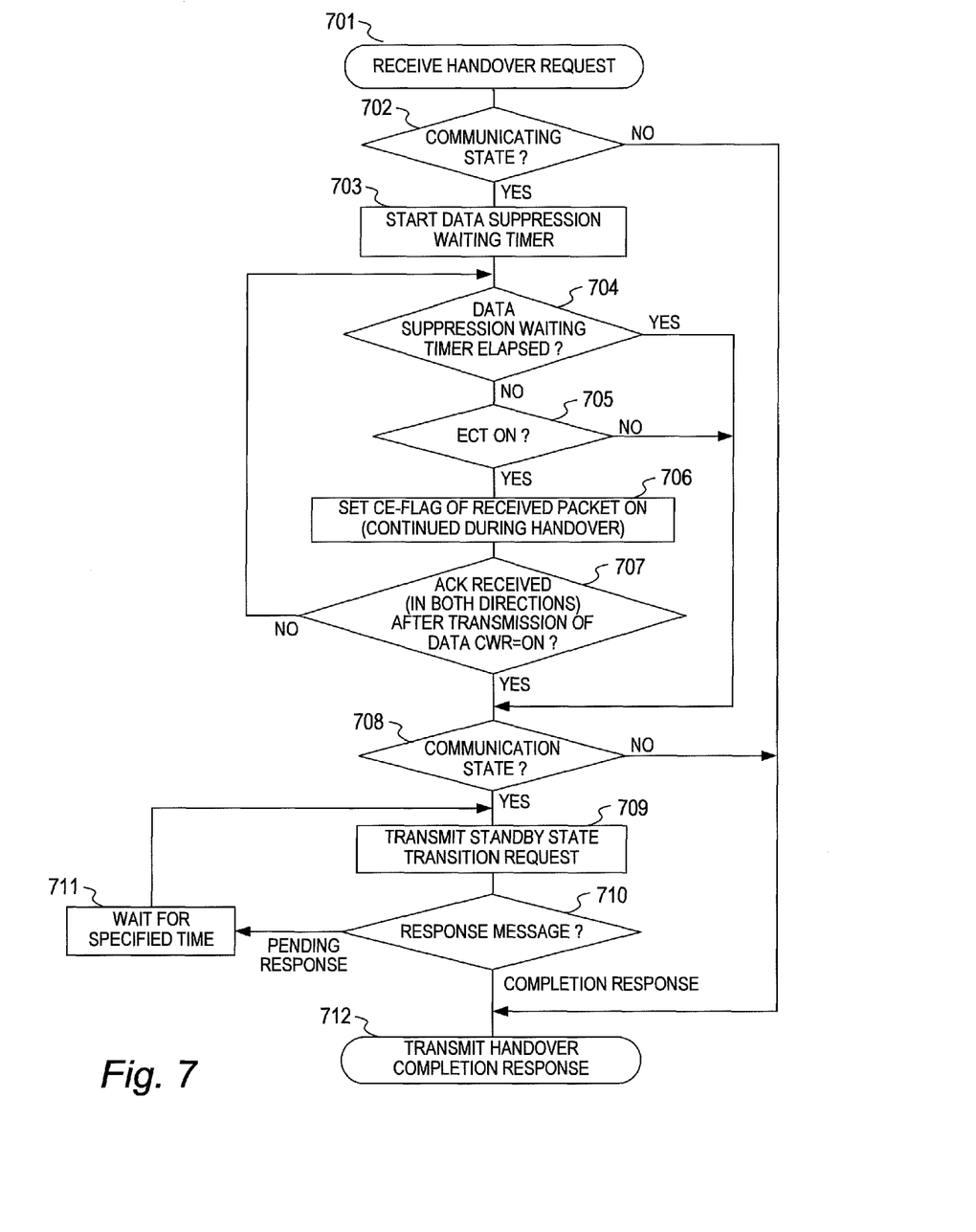
FIG. 7 is a flow chart of a process performed when a 3G driver and a WiMAX driver receive a handover request according to the first embodiment.

The 3G driver 510 transmits a packet in which the CWR flag is on, determines that the data suppression process has been completed in Step 1039 in which the ACK is received, and starts a process such as the transmission of a standby state transition request (1011 of FIG. 4A, 709 of FIG. 7).

In a case where the handover from the 3G network 100 to the WiMAX network 200 is completed and the communicating state (WiMAX active state) is set in the WiMAX network 200 (1040), the TCP/IP-1 unit 530 switches from the 3G driver 510 to the WiMAX driver 520 and transmits data. At this time, the WiMAX driver 520 transmits the packet received from the TCP/IP-1 unit 530 with the CE flag thereof kept off (1041) since receiving no handover request from the handover control module 550. It should be noted that in a case where the CE (Congestion Experienced) flag is off, it indicates that the congested state is released.

The TCP/IP-2 unit 531 transmits an ACK in which an ECE flag is off to the TCP/IP-1 unit 530 (1042). It should be noted that in a case where the ECE (ECN Echo) flag is off, the release of the congested state is notified.

In a case of receiving the ACK including the ECE flag being off, the TCP/IP-1 unit 530 cancels the data suppression process, restores the transmission window and cancels the congestion avoidance algorithm (1043).

Figure 5:
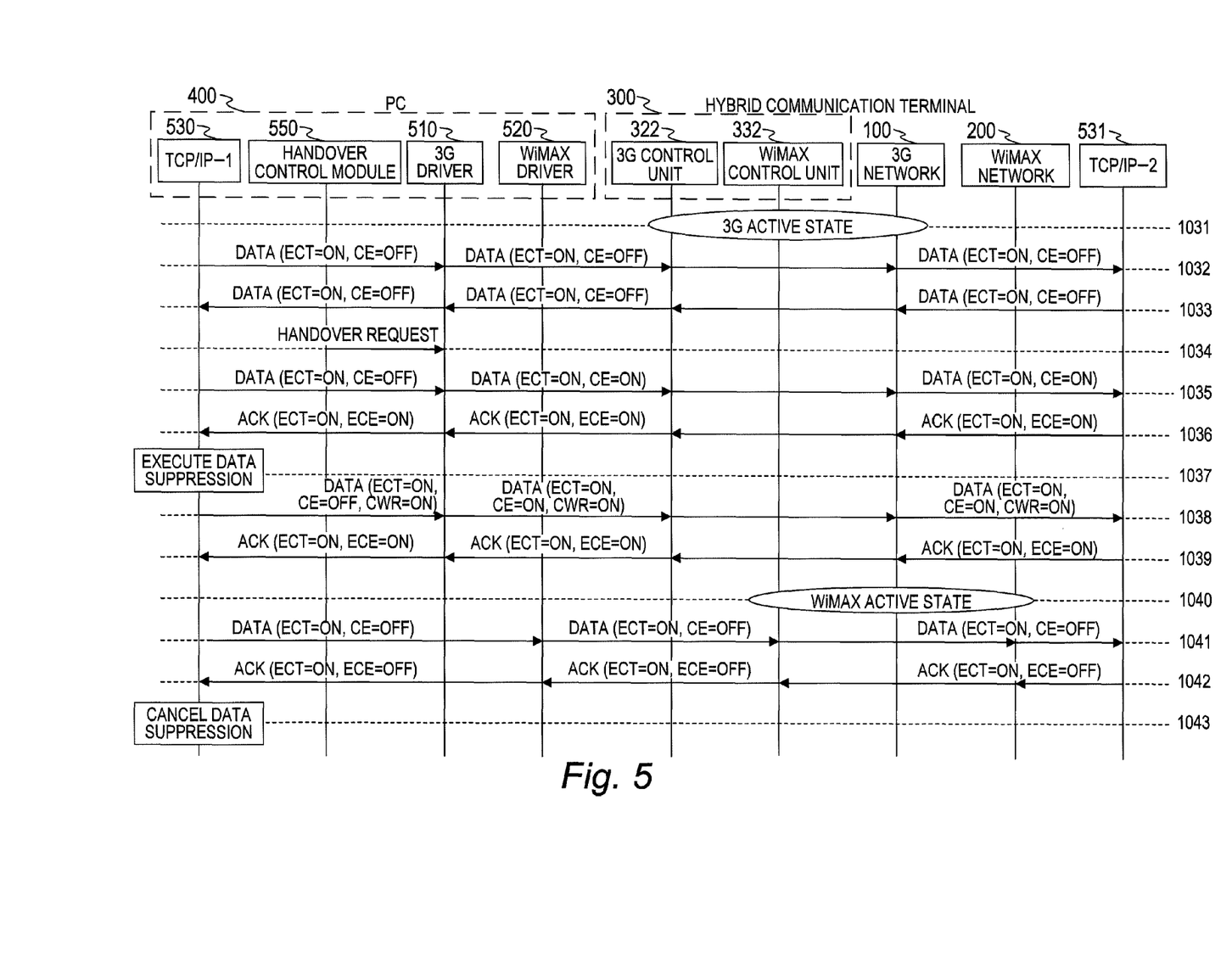
FIG. 5 is a sequence diagram showing a data suppression process according to the first embodiment.

Although the data suppression process from the TCP/IP-1 unit 530 to the TCP/IP-2 unit 531 is described in FIG. 5, a data suppression process from the TCP/IP-2 unit 531 to the TCP/IP-1 unit 530 can be also performed in a similar manner.

Specifically, in a case of receiving a handover request from the handover control module 550, the 3G driver 510 checks whether an ECT flag of an IP header of a packet received from the TCP/IP-2 unit 531 is on, and transfers this packet to the TCP/IP-1 unit 530 after setting a CE flag of the packet on in a case where the ECT flag is on. In this way, the data suppression process of the TCP/IP-2 unit is performed.

Further, after the handover from the 3G network 100 to the WiMAX network 200 is completed, the WiMAX driver 520 transfers the packet received from the TCP/IP-2 unit 531 to the TCP/IP-1 unit 530 with the CE flag of the packet kept off. In this way, the data suppression process of the TCP/IP-2 unit is canceled after the handover.

Figure 6:
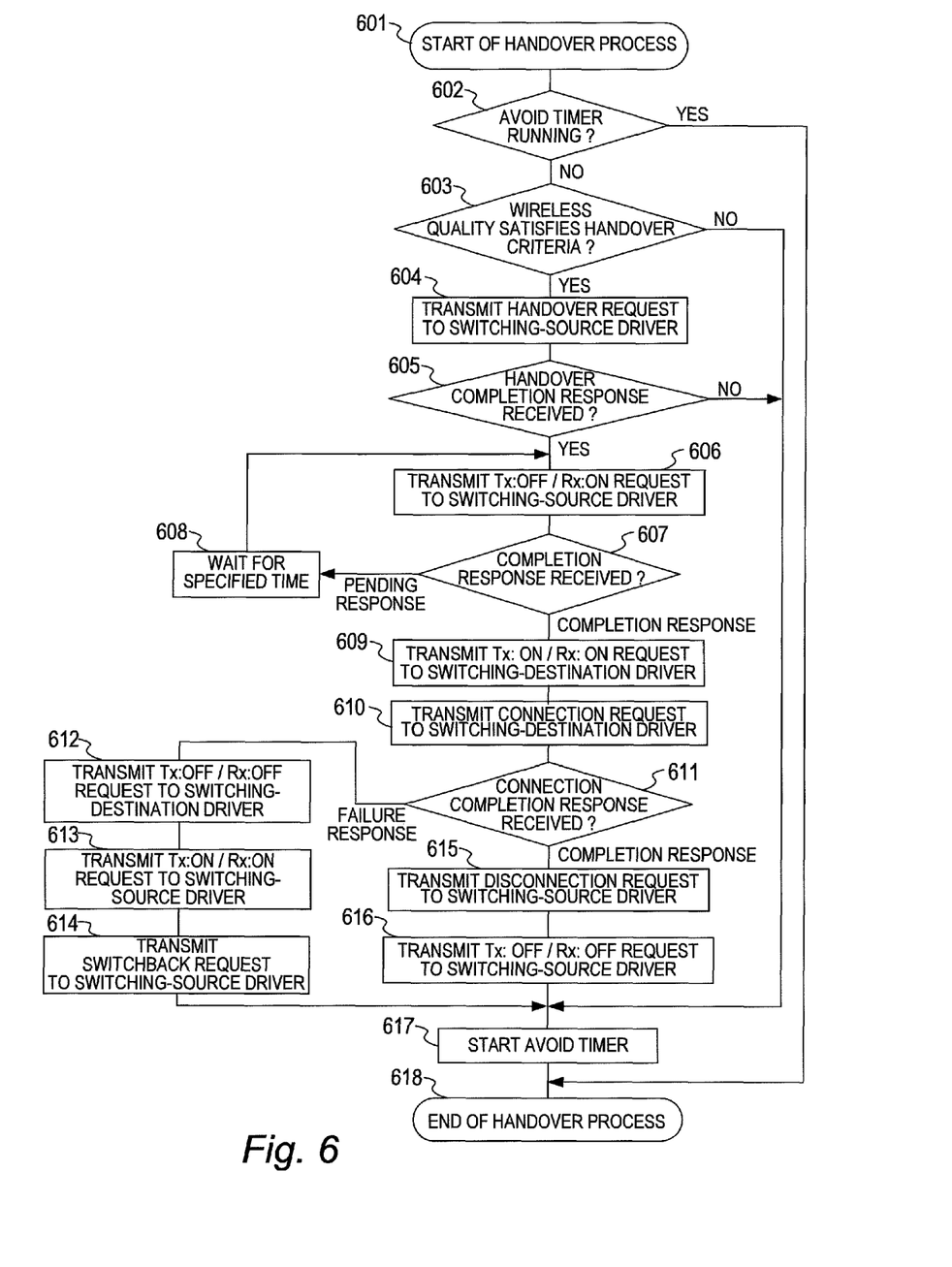
FIG. 6 is a flow chart of a handover process according to the first embodiment.

FIG. 6 is a flow chart of a handover process of the first embodiment. The handover process shown in FIG. 6 is performed by the handover control module 550.

The handover control module 550 starts the handover process at a predetermined timing (e.g. repeatedly or regularly) (601).

The handover control module 550 checks whether the avoid timer used to prevent the flapping of the handover is running (602). As a result, in a case where the avoid timer is running, the handover process is finished (618).

On the other hand, in a case where the avoid timer is running, the handover is possible. Thus, the wireless quality of the 3G network 100 and that of the WiMAX network 200 are confirmed (603). As a result, in a case where the wireless quality do not satisfy handover criteria, the avoid timer is started (617) and the handover process is finished (618).

On the other hand, in a case where the wireless quality satisfy the handover criteria, a handover request is transmitted to a switching-source driver (604).

The handover control module 550 waits for a handover completion response from the switching-source driver for a predetermined time (605) and starts the avoid timer (617) and finishes the handover process (618) in a case of unable to receive the response.

On the other hand, the handover control module 550 transmits a request of Tx:OFF/Rx:ON to the switching-source driver (606) In a case of receiving the handover completion response.

The handover control module 550 checks a response message from the switching-source driver (607). As a result, in a case where a Tx:OFF/Rx:ON request pending response is received (608), Tx:OFF/Rx:ON is requested again after the elapse of a predetermined time. The handover control module 550 requests Tx:ON/Rx:ON to a switching-destination driver (609) In a case of receiving a completion response of Tx:OFF/Rx:ON.

The handover control module 550 transmits a connection request to the switching-destination driver (610).

Thereafter, the handover control module 550 checks a response message from the switching-destination driver (611). As a result, in a case where a connection failure response is received, Tx:OFF/Rx:OFF is requested to the switching-destination driver (612), Tx:ON/Rx:ON is requested to the switching-source driver (613) and a switch-back request is made to the switching-source driver (614). Thereafter, the handover control module 550 starts the avoid timer (617) and finishes the handover process (618). In this case, the communication is continued in the switching-source system.

On the other hand, in a case of receiving a connection completion response in Step 611, the handover control module 550 requests a disconnection to the switching-source driver (615) and requests Tx:OFF/Rx:OFF to the switching-source driver (616). Thereafter, the handover control module 550 starts the avoid timer (617) and finishes the handover process (618).

FIG. 7 is a flow chart of a process performed when the 3G driver 510 and the WiMAX driver 520 of the first embodiment receive a handover request. Although the process performed by the 3G driver 510 is described below with reference to FIGS. 7 and 8, the process performed by the WiMAX driver 520 is also the same.

In a case of receiving a handover request, the 3G driver 510 starts this process (701) and first checks whether the communicating state is set (702). As a result, in a case where the communicating state is not set, the handover is possible. Thus, the 3G driver 510 transmits a handover completion response to the handover control module 550 (712). On the other hand, in a case of the communicating state, the 3G driver 510 starts a data suppression waiting timer (703).

The 3G driver 510 checks whether the data suppression process has been completed until time of the data suppression waiting timer elapses (704). The 3G driver 510 checks an ECT flag of an IP header of a packet received from the TCP/IP-1 unit 530 and the TCP/IP-2 unit 531 (705). As a result, in a case where the ECT flag is off, the process proceeds to Step 708 without the data suppression process being performed. On the other hand, in a case where the ECT flag is on, a CE flag of the received packet is set on (706). The CE flag is kept on until a handover completion response is transmitted in Step 712.

Thereafter, the 3G driver 510 checks whether an ACK in which an ECE flag is on has been received (707) after transmitting the packet in which a CWR flag of a TCP header is on. In Step 707, data are checked in both directions, i.e. from the TCP/IP-1 unit 530 to the TCP/IP-2 unit 531 and from the TCP/IP-2 unit 531 to the TCP/IP-1 unit 530.

In a case where the ACK including the ECE flag being on is received in Step 707, it is determined that the data suppression has been completed and the process proceeds to Step 708. It should be noted that the process proceeds to Step 708 also In a case where time of the data suppression waiting timer elapses.

In Step 708, the 3G driver 510 checks whether the communicating state is set. As a result, in a case where the communicating state is not set, the 3G driver 510 transmits a handover completion response to the handover control module 550 (712). On the other hand, in a case of the communicating state, the 3G driver 510 transmits a standby state transition request to the 3G control unit 322 (709).

It should be noted that, in Step 709, the WiMAX driver 520 transmits a standby state transition request to the WiMAX control unit 332.

The 3G driver 510 checks a response message from the 3G control unit 322 (or WiMAX control unit 332) (710).

It should be noted that the WiMAX driver 520 transmits the standby state transition request to the WiMAX control unit 332 in Step 709 and checks the response message from the WiMAX control unit 332 in Step 710.

As a result, in a case where the received response message is a standby state transition pending response, a standby state transition is requested again (709) after the elapse of a predetermined time (711). On the other hand, in a case where the received response message is a standby state transition completion response, a handover completion response is transmitted to the handover control module 550 (712).

Figure 8:
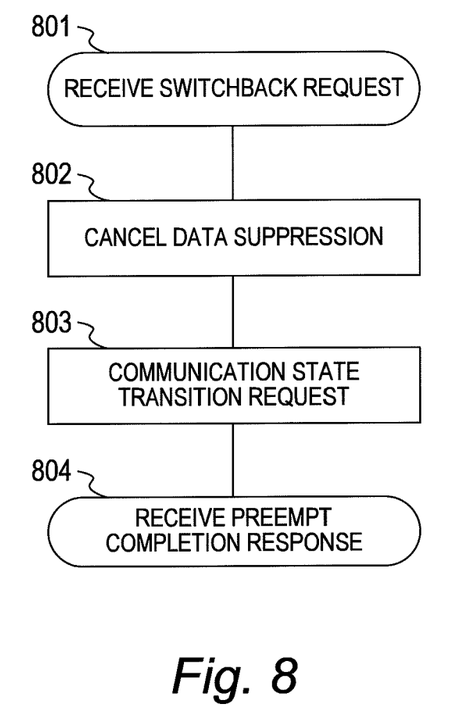
FIG. 8 is a flow chart of a process performed when the 3G driver and the WiMAX driver receive a switchback request according to the first embodiment.

FIG. 8 is a flow chart of a process performed when the 3G driver 510 and the WiMAX driver 520 of the first embodiment receive a switchback request. Although the process performed by the 3G driver 510 is described below, the process performed by the WiMAX driver 520 is also the same.

In a case of receiving a switchback request, the 3G driver 510 starts this process (801) and first cancels the data suppression process (802). Specifically, even if a packet is received from the TCP/IP-1 unit 530 and the TCP/IP-2 unit 531, a CE flag of the received packet is not set on. In this way, the data suppression process is canceled in the TCP/IP-1 unit 530 and the TCP/IP-2 unit 531.

Subsequently, the 3G driver 510 transmits a communicating state transition request to the 3G control unit 322 (803). Finally, a switchback completion response is transmitted to the handover control module 550 (804).

Figure 9:
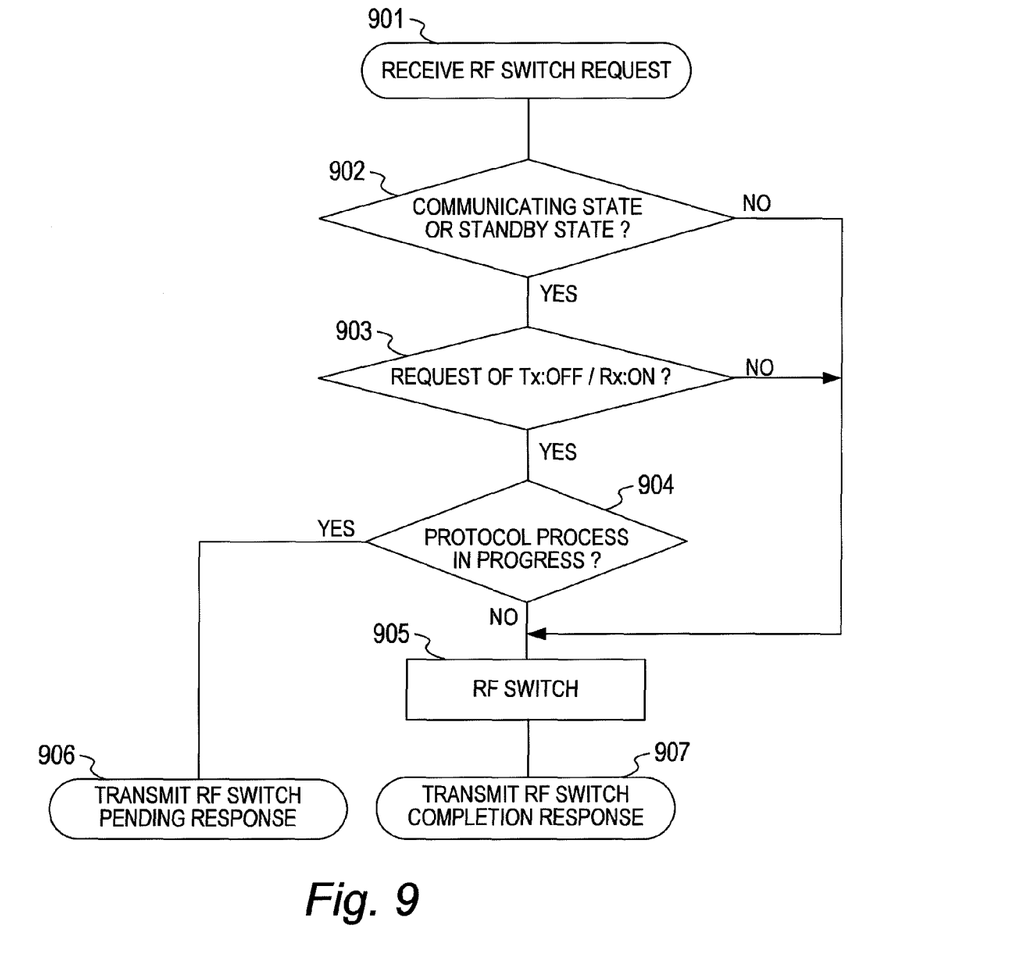
FIG. 9 is a flow chart of a process performed when the 3G control unit and the WiMAX control unit receive an RF switch request according to the first embodiment.

FIG. 9 is a flow chart of a process performed when the 3G control unit 322 and the WiMAX control unit 332 of the first embodiment receive an RF switch request. In a case of receiving an RF switch request, the 3G control unit 322 and the WiMAX control unit 332 activate or deactivate the Tx and Rx. Although the process performed by the 3G control unit 322 is described below, the process performed by the WiMAX control unit 332 is also the same.

In a case of receiving an RF switch request, the 3G control unit 322 starts this process (901) and first checks whether the communicating state or the standby state is set (902). In a case where neither the communicating state nor the standby state is set, the operations of the transmitter and the receiver are switched in accordance with a requested switch content (905) and an RF switch completion response is transmitted (907).

On the other hand, in a case where the communicating state or the standby state is set, it is checked whether the RF switch request is Tx:OFF/Rx:ON (903). Unless the RF switch request is Tx:OFF/Rx:ON, the operations of the transmitter and the receiver are switched in accordance with the requested switch content (905) and an RF switch completion response is transmitted (907).

In a case where the RF switch request is Tx:OFF/Rx:ON, it is checked whether the protocol process is in progress. The RF switch is not performed and an RF switch pending response is transmitted (906) in a case where the protocol process is in progress. On the other hand, unless the protocol process is in progress, the operations of the transmitter and the receiver are switched in accordance with the requested switch content (905) and an RF switch completion response is transmitted (907).

Second Embodiment

Although the hybrid communication terminal 300 and the PC 400 are connected by the USB interface in the first embodiment described above, the hybrid communication terminal 300 and the PC 400 may be integrally configured in one chassis. In this case, the HUB 310 and the CPU 420 are connected by an internal bus (e.g. PCI bus or the like) of the PC 400.

As described above, since the handover is performed between different networks while being led by the hybrid communication terminal 300 in the embodiments of the present invention, it is not necessary to change the configurations of the network sides. Thus, it is not necessary to bear cost for facility investment and a time until the start of the service can be shortened. Further, since the handover can be performed within the range of the conventional specification, it is not necessary to specify a new standard in standard groups and the like.

Further, in the embodiments of the present invention, either one of the transmitter of the first wireless functional unit and that of the second wireless functional unit is deactivated at the time of the handover. This can suppress power consumption during the handover. This has an advantage of being able to support a versatile interface and being usable in a general PC in a data card type hybrid communication terminal which is connected to a PC and operates by power supplied from the PC. Further, in a handset type communication terminal which does not receive power supply from a PC, a battery usage time can be extended by suppressing power consumption.

Further, since only the receiver of the second wireless functional unit is activated at a predetermined timing (e.g. regularly) and the wireless quality of the second wireless network is confirmed even during the connection to the first wireless network in the embodiments of the present invention, it is possible to confirm the wireless quality of the second wireless network during the connection to the first wireless network while suppressing power consumption.

Further, since the data suppression process is performed to set the first wireless network in the standby state during the execution of the handover in the embodiments of the present invention, the handover to the second wireless network can be performed without missing a packet even during the communication with the first wireless network.

Further, since the handover is performed with the first wireless network set in the standby state in the embodiments of the present invention, the first wireless network can be set in the communicating state again to continuously communicate in a case where the handover to the second wireless network fails.

Further, in the embodiments of the present invention, whether the protocol process is in progress is checked during the execution of the handover and the handover is kept on hold in a case where the protocol process is in progress. For example, the protocol process may be performed due to the crossing of a subnetwork in the first wireless network during the communication with the first wireless network. In a case where the transmitter of the first wireless functional unit is stopped at this timing, it may be judged at the network side that session negotiation has failed and the communication may be disconnected. Thus, the disconnection of the communication can be prevented by keeping the handover on hold during the protocol process and starting the handover again after the protocol process is finished.

Further, since the timer used to prevent the flapping of the handover is started after the handover and the handover is not performed while the timer is running in the embodiments of the present invention, unstable communication caused by the flapping of the handover can be prevented.

While the present invention has been described in detail and pictorially in the accompanying drawings, the present invention is not limited to such detail but covers various obvious modifications and equivalent arrangements, which fall within the purview of the appended claims.

What is claimed is:

1. A communication apparatus comprising:
    a first wireless functional unit which includes a first transmitter for transmitting data through a first wireless network and a first receiver for receiving data through the first wireless network;
    a second wireless functional unit which includes a second transmitter for transmitting data through a second wireless network and a second receiver for receiving data through the second wireless network; and
    a connection unit for connecting the first wireless functional unit and the second wireless functional unit to a computer; wherein:
    the communication apparatus controls the first wireless functional unit and the second wireless functional unit in accordance with an instruction from the computer;
    a transmitter and a receiver of a wireless functional unit connecting a current wireless network are activated, a transmitter of a wireless functional unit to be connecting a target wireless network which is a handover target is deactivated, a receiver of the wireless functional unit to be connecting the target wireless network is activated and the receivers regularly obtain the wireless quality of the current wireless network and the target wireless network
    the wireless functional unit connecting the current wireless network performs a data suppression process by a congestion avoidance algorithm when carrying out communication in a case where the wireless quality of the current wireless network is less than a predetermined threshold and the wireless quality of the target wireless network is more than a predetermined threshold;
    the wireless functional unit connecting the current wireless network checks whether the protocol process is in progress after performing the data suppression process;
    the wireless functional unit connecting the current wireless network performs the handover after being transitioned to a standby state in which the data transfer and the protocol process are not in progress in a case where the protocol process is not in progress;
    the wireless functional unit connecting the current wireless network cancels the data suppression process by stopping the congestion avoidance algorithm, and deactivate the transmitter of the wireless functional unit connecting the current wireless network after the completion of the handover; and
    the wireless functional unit to be connecting the target wireless network activates the transmitter and the receiver after the deactivation of the transmitter of the wireless functional unit connecting the current wireless network.

2. The communication apparatus according to claim 1, wherein the wireless functional unit connecting the current wireless network
    transitions to the standby state in the current wireless network, and performs the handover after a predetermined time period and the protocol process is finished when the first wireless functional unit is performing the protocol process.

3. The communication apparatus according to claim 1, wherein the wireless functional unit connecting the current wireless network is disconnected from the current wireless network and the transmitter and the receiver of the wireless functional unit connecting the current wireless network are deactivated in a case where the connection between the wireless functional unit connecting the current wireless network and the current wireless network is in a standby state and the wireless functional unit to be connecting the target wireless network has established a connection to the target wireless network.

4. The communication apparatus according to claim 1, wherein the transmitter and the receiver of the wireless functional unit to be connecting the target wireless network are deactivated in a case where the connection between the wireless functional unit connecting the current wireless network and the first wireless network is in a standby state and the wireless functional unit to be connecting the target wireless network has failed to establish a connection to the second wireless network, and
    the transmitter and the receiver of the wireless functional unit connecting the current wireless network are activated and the wireless functional unit connecting the current wireless network returns to a communicating state with the first wireless network after the deactivation.

5. The communication apparatus according to claim 1, wherein
    the computer starts a timer after the handover, and
    the communication apparatus is controlled not to perform the handover before time of the timer is not up.

6. The communication apparatus according to claim 1, wherein the communication apparatus is independent of the computer in hardware and connected to the computer via a communication interface.

7. The communication apparatus according to claim 1, wherein the communication apparatus is configured integrally to the computer and connected to an internal bus of the computer.

8. A handover control method in a communication apparatus which is connected to a computer and controlled by the computer,
    the communication apparatus including a first wireless functional unit which transmits and receives data through a first wireless network, and a second wireless functional unit which transmits and receives data through a second wireless network;
    the method, including the steps of:
    activating a transmitter and a receiver of a wireless functional unit connecting a current wireless network, deactivating a transmitter of a wireless functional unit to be connecting a target wireless network which is a handover target, activating a receiver of the wireless functional unit to be connecting the target wireless network and regularly obtaining wireless quality of the current wireless network and the target wireless network in a case of a handover between the first wireless network and the second wireless network;

performing a data suppression process by a congestion avoidance algorithm when the wireless functional unit connecting the current wireless network is in communicating, in a case where the wireless quality of the current wireless network is less than a predetermined threshold and the wireless quality of the target wireless network is more than a predetermined threshold;

checking whether the protocol process is in progress after performing the data suppression process after performing the data suppression process;

performing the handover after being transitioned to a standby state in which the data transfer and the protocol process is not in progress in a case where the protocol process is not in progress;

cancelling the data suppression process by stopping the congestion avoidance algorithm, and deactivate the transmitter of the wireless functional unit connecting the current wireless network after the completion of the handover; and activating the transmitter and the receiver of the wireless functional unit to be connecting the target wireless network after the deactivation of the transmitter of the wireless functional unit connecting the current wireless network.

* * * * *